United States Patent [19]

Marini et al.

[11] 4,357,029
[45] Nov. 2, 1982

[54] UTILITY CART

[76] Inventors: Louis G. Marini; Thomas O. Marini, both of P.O. Box 6, Blackwood, N.J. 08012

[21] Appl. No.: 177,579

[22] Filed: Aug. 13, 1980

[51] Int. Cl.³ ............................................. B62B 1/22
[52] U.S. Cl. .................................. 280/47.19; 211/71; 248/129; 248/DIG. 7
[58] Field of Search .................. 280/47.19, 781, 42.26; 248/129, DIG. 7; 211/71, 182; 312/111, 263, 257 SK, 254; 52/690, 693; 403/339, 361, 379

[56] References Cited

U.S. PATENT DOCUMENTS

| D. 146,848 | 6/1947 | Brickson | 280/47.19 X |
|---|---|---|---|
| 2,569,910 | 10/1951 | Vehuti | 52/693 X |
| 2,940,707 | 6/1960 | Bland et al. | 248/129 |
| 3,111,333 | 11/1963 | Marini et al. | 280/47.19 |
| 3,341,219 | 9/1967 | Marini et al. | 211/71 X |
| 3,379,451 | 4/1968 | Marini et al. | 280/47.19 |
| 3,507,399 | 4/1970 | Gruenberg | 211/182 X |
| 3,645,569 | 2/1972 | Reilly | 403/361 X |
| 3,749,414 | 7/1973 | Lynn | 280/47.19 |
| 3,912,087 | 10/1975 | Zeischegg | 211/182 X |
| 3,940,162 | 2/1976 | Winslow et al. | 280/781 |

Primary Examiner—Richard A. Bertsch
Assistant Examiner—Michael Mar
Attorney, Agent, or Firm—Duffield & Lehrer

[57] ABSTRACT

A utility cart particularly adapted for transporting trash cans is comprised of a plurality of prefabricated, rigid, molded plastic components which can be readily assembled by a consumer. The cart includes substantially U-shaped side structures which are joined together at the bottoms by a rear crossbar and a front axle which also function to support the trash cans. The rear upwardly extending legs of the U form the cart handles. A substantially rectangularly shaped frame joins the upper ends of all of the U legs and acts as a retainer for holding the trash cans in place.

1 Claim, 5 Drawing Figures

UTILITY CART

BACKGROUND OF THE INVENTION

The present invention is directed toward a utility cart and more particularly toward a utility cart which is particularly adapted for transporting trash cans and which is constructed almost entirely of prefabricated, rigid, molded plastic components.

Utility carts adapted for domestic use in the holding and transporting of trash cans and similar containers have been known and used for many years. One example of a prior art utility cart of this type is shown in U.S. Pat. No. 3,111,333 which issued to the present Applicants.

Prior art utility carts such as the one described in Applicants' above-identified patent have been constructed almost entirely from tubular metal. The cost of these prior carts, however, has been increasing steadily due to the increase in the cost of raw material and in the manufacturing costs. Furthermore, these prior art devices have been comprised of numerous components which have made consumer assembly somewhat difficult. These difficulties are compounded by the fact that it is difficult to precisely form and machine the various tubular metal components so that they accurately meet at the numerous connecting points.

SUMMARY OF THE INVENTION

By producing a utility cart of prefabricated, molded plastic components as described in the present application, substantially all of the problems of the prior art described above have been overcome. Molding the various components not only decreases manufacturing costs but allows for the more precise manufacture of the various components so that assembly by the consumer is greatly facilitated. The utility cart of the present invention which is particularly adapted for transporting trash cans includes substantially U-shaped side structures which are joined together at the bottoms by a rear crossbar and a front axle which also function to support the trash cans. The rear upwardly extending legs of the U form the cart handles. A substantially rectangularly shaped frame joins the upper ends of all of the U legs and acts as a retainer for holding the trash cans in place.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
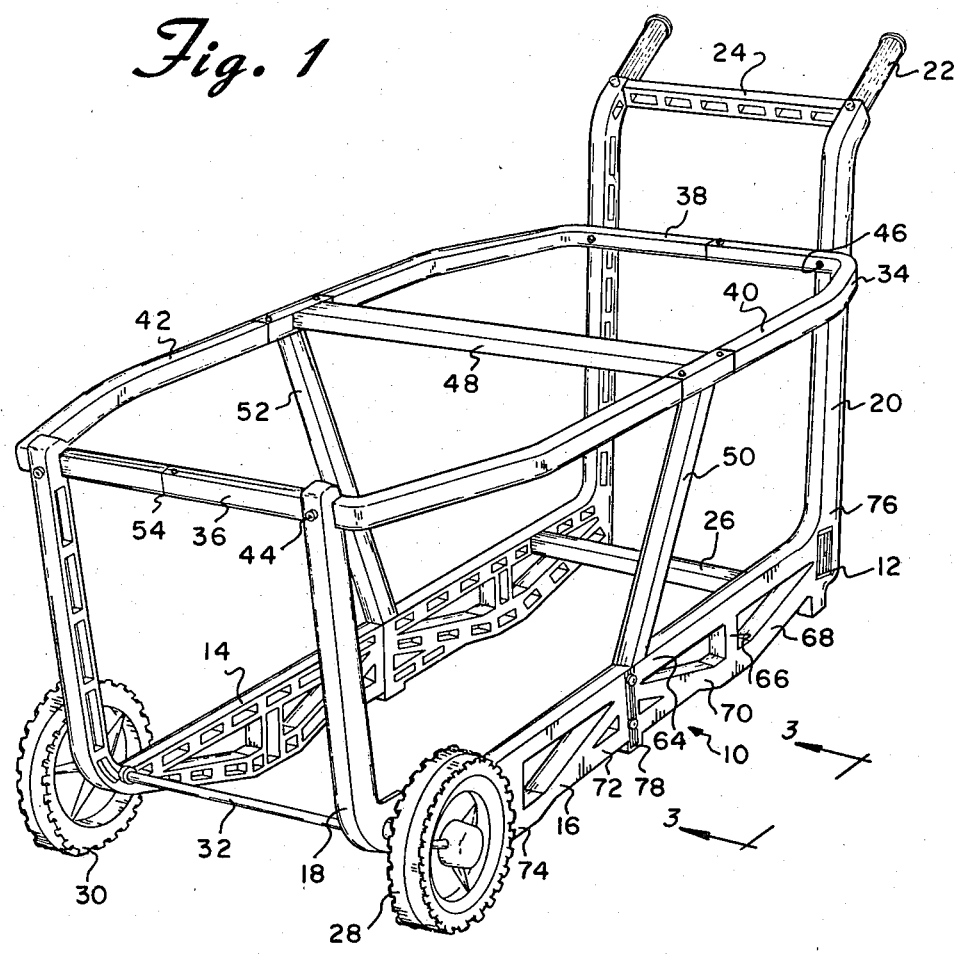
FIG. 1 is a front perspective view of a utility cart constructed in accordance with the principles of the present invention.
Figure 2:
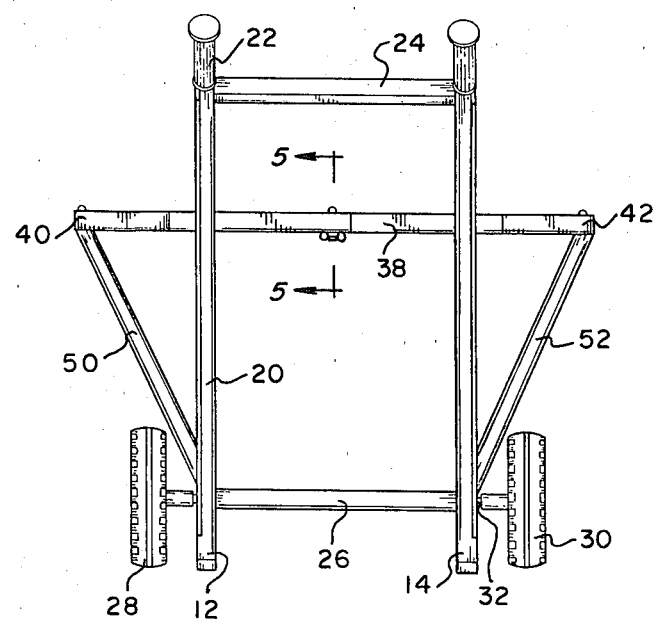
FIG. 2 is a rear elevational view thereof.

Referring now to the drawing in detail wherein like reference numerals have been used throughout the various figures to designate like elements, there is shown in FIG. 1 a utility cart constructed in accordance with the principles of the present invention and designated generally at 10. Cart 10 includes spaced apart and substantially U-shaped side frame members 12 and 14. Throughout the present description, reference may be made to only left side frame member 12 or to only right side frame member 14. It should be understood that this is for convenience only and, as can clearly be seen from FIGS. 1 and 2, the entire cart is substantially symmetrical. Accordingly, it should be readily apparent that any description of one side of the cart is equally applicable to the other.

Each side frame member such as member 12, includes a longitudinally and horizontally extending lower member 16 and a pair of upwardly extending legs 18 and 20. Each of the legs 18 and 20 is preferably integrally joined with the lower member 16; leg 18 extending upwardly at the front of the cart and leg 20 extending upwardly adjacent the rear thereof.

The upper ends of the rear legs such as leg 20, extend above the height of the front legs and is curved rearwardly to form handles 22. A first crossbar 24 extends horizontally between the two side frame members 12 and 14 at a position adjacent the handles 22.

A second crossbar 26 also extends horizontally between the left and right side frame members 12 and 14 at a position adjacent the rear portion of the lower frame member 16. The second crossbar 16 is located slightly inwardly from the rear of the cart so that the same can function not only to secure the side frame members together but also to support a trash can which is placed in the cart above the crossbar 26.

A pair of wheels 28 and 30 are mounted at the forward end of the cart 10 at the ends of horizontally extending axle 32. Axle 32 passes through openings in the side frame members 12 and 14 adjacent the forward portion of the lower frame members. Preferably, axle 32 is positioned inwardly of the forward end of the cart 10 so that the same can also function to support the forward end of a trash can being carried there above.

A substantially rectangularly shaped upper frame member 34 is connected to the upwardly extending legs 18 and 20 and functions to maintain the trash cans being carried by the cart in upright, stable positions. The upper frame member 34 includes a front bar 36, a rear bar 38 and left and right side bars 40 and 42. The front bar 36 is connected to the extreme upper ends of the front legs 18 by bolts 44. Similarly, bolts 46 secure the rear bar 38 to the upper portion of the rear legs 20. Additional structural support can also be provided by intermediate support bars 48, 50 and 52. Bar 48 extends transversely across the width of the cart 10 between the left side bar 40 and the right side bar 42 at a point approximately midway along the length of the cart. In addition to providing further structural support, bar 48 also helps to maintain the trash cans in a substantially upright position. Intermediate support bars 50 and 52 extend from the upper side bars to the lower frame members as shown most clearly in FIGS. 1 and 2. Any known connecting means may be utilized for connecting the ends of the support bars to the remaining parts of the utility cart 10.

Figure 5:
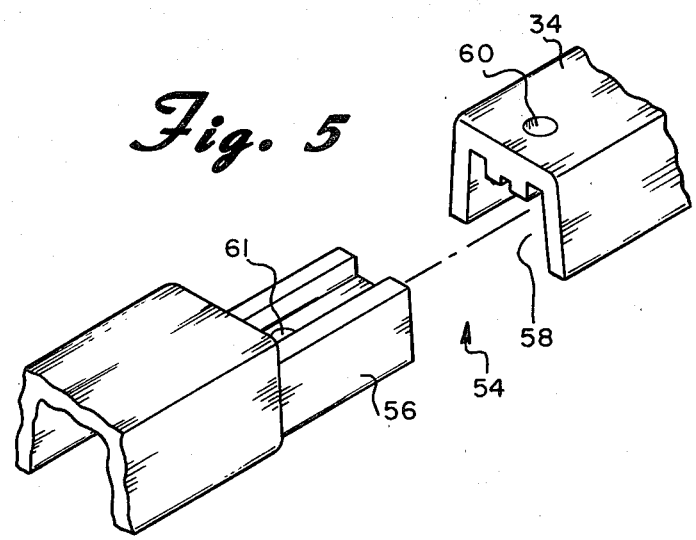
FIG. 5 is a detailed view showing the manner in which connections are made between the portions of the upper rectangular frame member.

The upper frame member 34 may be molded as a single unit. Preferably, however, the same is molded in a plurality of sections which are then joined together. Several of such joints are shown in FIG. 1 such as joint 54 at the forward end of the frame member 34. Preferably, these joints are formed in the manner illustrated in FIG. 5. As can be seen in this figure, one of the frame members includes an extension 56 which is smaller than the remaining parts of the frame member. This extension 56 is adapted to cooperate in a telescoping manner with a complementary opening 58 in the next adjoining frame member. A bolt is then passed through the holes 60 and 61 to securely fasten the adjoining frame members together to form the joint 54.

For additional added structural support, each of the lower frame members such as frame member 16, includes one or more inverted trusses. The lower frame member 16 is thus comprised of a horizontal and longitudinally extending bar 64 having one or more struts 66 extending downwardly therefrom. A pair of diagonal bars 68 and 70 extend from the bottom of the struts 66 back up to the bar 64. As shown in FIG. 1, each side frame member includes two inverted trusses such as described above. An additional lower horizontally extending bar 72 extends between the lower portions of the two trusses for even further additional support.

Each of the side frame members 12 or 14 may be molded as a single unit. Preferably, however, each side frame member is comprised of two halves which are joined together. This reduces manufacturing and shipping costs.

Figure 3:
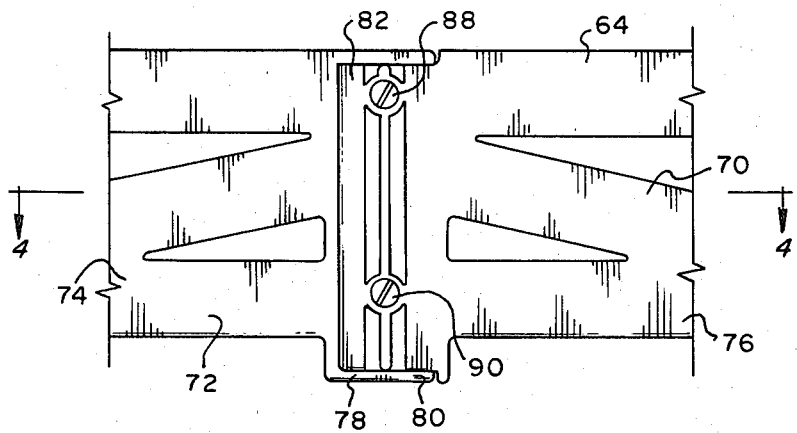
FIG. 3 is an enlarged right side elevational view of a portion of the lower frame member showing the details of a connection.
Figure 4:
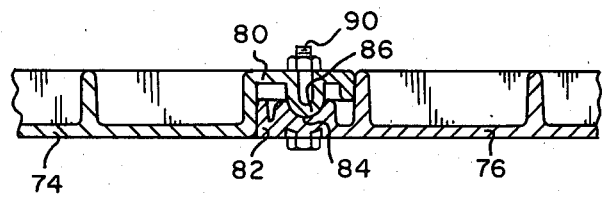
FIG. 4 is a cross-sectional view taken through the lines 4—4 of FIG. 3.

As shown in FIGS. 1, 3 and 4, for example, left side frame member 12 is comprised of a front section 74 and a rear section 76 which are joined together at joint 78. Joint 78 which is most clearly shown in FIGS. 3 and 4 includes overlapping portions 80 and 82 of the front and rear sections 74 and 76, respectively. Joint portion 82 includes an elongated groove 84 in the inwardly facing surface thereof which runs substantially the entire height of the portion 82. A complementary tongue element 86 is formed on the outwardly facing surface of joint portion 80 and fits into the groove 84. A pair of bolts 88 and 90 hold the tongue and groove and thereby the joint firmly together. As should be readily apparent to those skilled in the art, this type of joint reduces the sharing stress on the bolts and on the plastic in the areas around the bolts while preventing the lower frame members from bending.

In order to reduce manufacturing costs and shipping expenses, the various plastic frame members and components are not solid plastic. Rather, as shown in FIG. 1 and as is known in the plastic molding art, the outer surfaces of the molded pieces are smooth and continuous. The inner surfaces, however, have a plurality of holes therein extending into the interior of the frame members as shown in FIG. 1.

The present invention may be embodied in other specific forms without departing from the spirit or essential attributes thereof and accordingly, reference should be made to the appended claims rather than to the foregoing specification as indicating the scope of the invention.

We claim:

1. A utility cart particularly adapted for transporting trash cans comprising; a pair of molded plastic spaced apart and substantially U-shaped side frame members, each of said side frame members being comprised of two portions which are joined together by connecting means, said connecting means including an outwardly facing surface on one of said portions having a raised elongated tongue element thereon and an inwardly facing surface on the other of said portion overlapping said outwardly facing surface and including an elongated recessed groove element therein complimentary to said tongue element, said tongue element fitting within said groove element, and means for maintaining said tongue element within said groove element, each of said frame members having a longitudinally and horizontally extending lower member and a pair of upwardly extending legs, each lower member including a longitudinally and horizontally extending bar having a strut member extending vertically downwardly therefrom and a pair of diagonal bars extending from the end of said strut member to said horizontally extending bar, the upper end of the rear leg of each of said side frame members being curved rearwardly to form a pair of handles, a first molded plastic crossbar extending horizontally between said frame members adjacent said handles, a second molded plastic crossbar extending horizontally between said frame members adjacent the rear of said lower member, said second crossbar securing said frame members together and being adapted to support a trash can thereon, a horizontally disposed axle extending between said frame members adjacent the forward end of said lower member, said axle carrying a wheel at each end thereof and being adapted to support a trash can thereon, a substantially rectangularly shaped molded plastic upper frame member, said upper frame member being substantially horizontally disposed and being connected to the upper ends of each of said legs.

* * * * *